(12) United States Patent
Lu

(10) Patent No.: US 7,066,063 B2
(45) Date of Patent: Jun. 27, 2006

(54) POWER TRANSMISSION MECHANISM FOR A TURRET OF A LATHE

(75) Inventor: Yung-Hsiang Lu, Chiayi (TW)

(73) Assignee: Factory Automation Technology Co., Ltd., Chiayi (TW)

( * ) Notice: Subject to any disclaimer, the term of this patent is extended or adjusted under 35 U.S.C. 154(b) by 164 days.

(21) Appl. No.: 10/840,520

(22) Filed: May 7, 2004

(65) Prior Publication Data

US 2005/0247172 A1     Nov. 10, 2005

(51) Int. Cl.
*B23B 3/16*     (2006.01)
(52) U.S. Cl. .................. 82/121; 74/813 R; 74/816; 74/817; 74/813 C; 74/813 L
(58) Field of Classification Search .................. 82/120, 82/121, 159; 74/813 C, 813 R, 813 L
See application file for complete search history.

(56) References Cited

U.S. PATENT DOCUMENTS

| | | | | |
|---|---|---|---|---|
| 4,379,415 A | * | 4/1983 | Klancnik et al. | ............. 82/159 |
| 5,271,134 A | * | 12/1993 | Schips | ..................... 29/48.5 A |
| 5,388,743 A | * | 2/1995 | Su et al. | .................... 74/813 L |
| 5,657,523 A | * | 8/1997 | Lin et al. | ................. 29/48.5 A |
| 2003/0221525 A1 | * | 12/2003 | Katoh et al. | .................. 82/121 |
| 2004/0003690 A1 | * | 1/2004 | Katoh et al. | .................. 82/121 |

* cited by examiner

*Primary Examiner*—Boyer D. Ashley
*Assistant Examiner*—Sara Addisu
(74) *Attorney, Agent, or Firm*—Rosenberg, Klein & Lee

(57) ABSTRACT

A turret of a lathe has a power transmission that is used for moving a tool Disk secured on a shaft to a secured position where the disk is engaged with a clutch. The transmission includes a piston, and a force multiplier unit, which includes a ring, a sleeve secured to the piston, and steel beads. The ring has first sloping trenches. The sleeve has sloping trenches that are less steep and opposing the first trenches, and has recesses connected to the trenches. The steel beads are held in respective ones of the spaces defined by the sloping trenches and the recesses, and are positioned next to a gear secured on the shaft such that when the piston is actuated for moving the tool disk towards the secured position, the steel beads will push the gear with multiplied force output while being rolled along the sloping trenches.

4 Claims, 5 Drawing Sheets

POWER TRANSMISSION MECHANISM FOR A TURRET OF A LATHE

BACKGROUND OF THE INVENTION

1. Field of the Invention

The present invention relates to a power transmission mechanism for a turret of a lathe, more particularly one equipped with a force multiplier unit, which includes several steel beads used for pushing a tool disk of the lathe, and several sloping trenches used for guiding the beads such that the tool disk can be pushed to a secured position by the beads with multiplied force output, and such that an air pressure power source can be used instead of a hydraulic power source while the force output is enough for making the tool disk effectively secured in position.

2. Brief Description of the Prior Art

Referring to FIG. 6, a conventional turret 2 of a lathe includes a shaft housing 21, a central shaft 22 in the shaft housing 21, a piston 23, and a clutch 24; the central shaft 22 has a step-shaped portion 221, and a gear 222 secured thereon; oil passages 231, and 232 of a hydraulic system are provided so that the piston 23 can be left and right displaced by means of hydraulic oil; the piston 23 is positioned between the step-shaped portion 221 of the central shaft 22 and the gear 222; the clutch 24 is fitted to the shaft housing 21. Furthermore, a tool disk 3 is securely joined to one end of the central shaft 22 next to the clutch 24. Thus, when the piston 23 is moved rightwards by means of hydraulic oil supplied through the oil passage 231, the central shaft 22 will be made to move rightwards together with the gear 222, and in turns, the tool disk 3 will be engaged with the clutch 24, and secured in position. When the piston 23 is moved leftwards by means of hydraulic oil supplied through the oil passage 232, the central shaft 22 will be pushed leftwards at the step-shaped portion 221 by the piston 23, and in turns, the tool disk 3 will disengage the clutch 24, and can be turned for switching one tool to another.

Enough power can be provided for moving the tool disk 3 between the engaged position and the disengaged one with the help of the hydraulic system and the oil passages, but conventional hydraulic systems have some disadvantages, which also exist in the above structure, as compared with air pressure means, e.g. high manufacturing cost, oil leakage, high maintenance cost, and high power consumption. However, it is also infeasible to replace the hydraulic system with an air pressure means because an air pressure means has to have larger dimensions than the hydraulic system to provide the same power output as the hydraulic system, and increase to dimensions will cause increase to both cost and weight.

SUMMARY OF THE INVENTION

It is a main object of the present invention to provide a power transmission mechanism for a turret of a lathe to overcome the above disadvantages.

The power transmission mechanism is used for moving a tool disk, which is securely joined to a central shaft of the turret, to a secured position, in which position the tool disk is engaged with a clutch. The power transmission includes a piston, and a force multiplier unit, which includes a support ring, a sleeve secured to the piston, and steel beads. The ring has sloping trenches. The sleeve has sloping trenches opposing the trenches of the ring, and recesses connected to the trenches thereof. The steel beads are held in respective ones of spaces defined by the sloping trenches, and the recesses, and are positioned next to a gear secured on the central shaft such that when the piston is made to move the tool disk towards the secured position, the steel beads will be made to push the gear with multiplied force output while being rolled along the sloping trenches, thus making the tool disk effectively secured in position. Therefore, an air pressure power source can be used instead of a hydraulic power source while the force output is enough for making the tool disk effectively secured in position.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
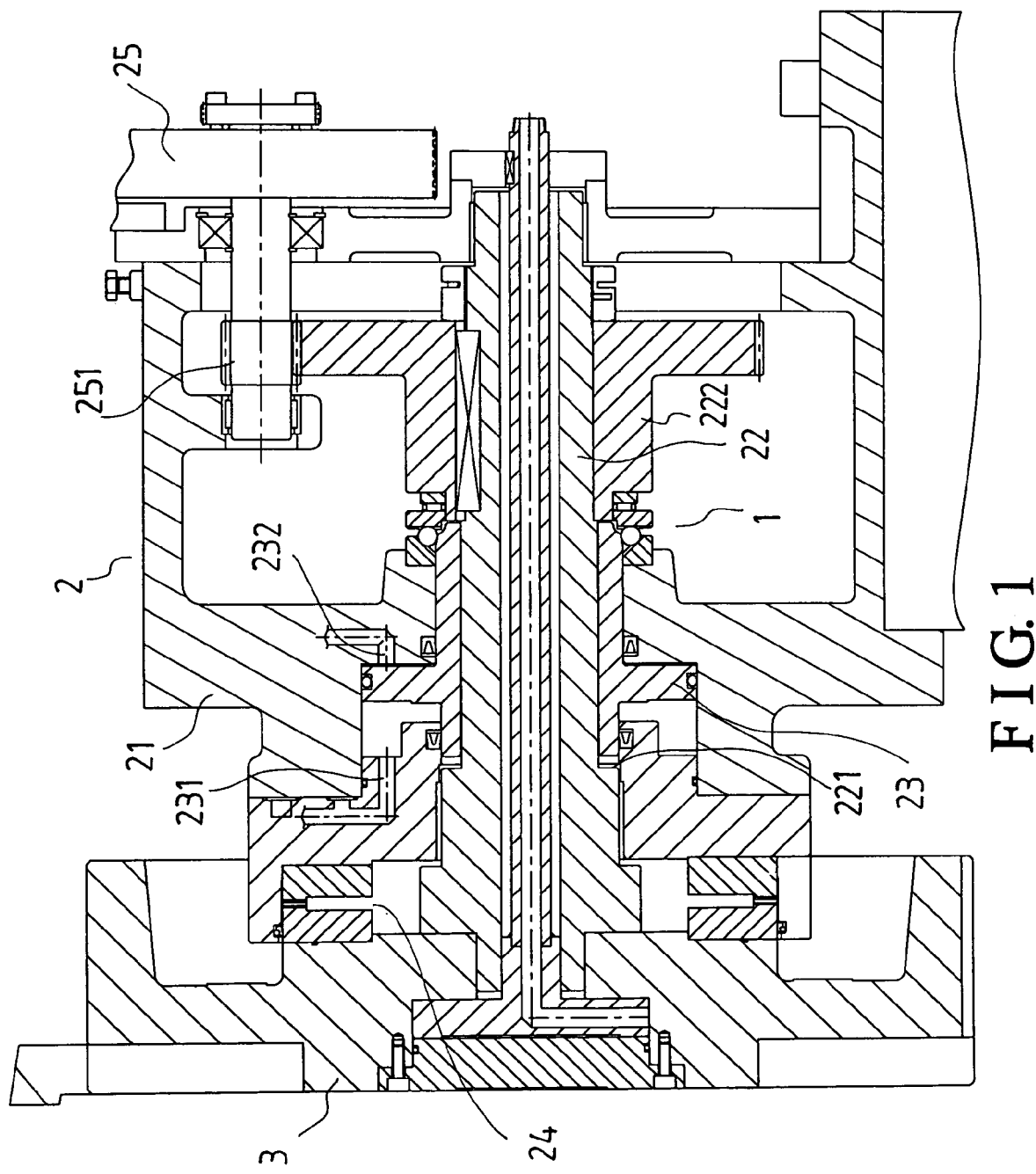
FIG. 1 is a cross-sectional view of the present invention.
Figure 2:
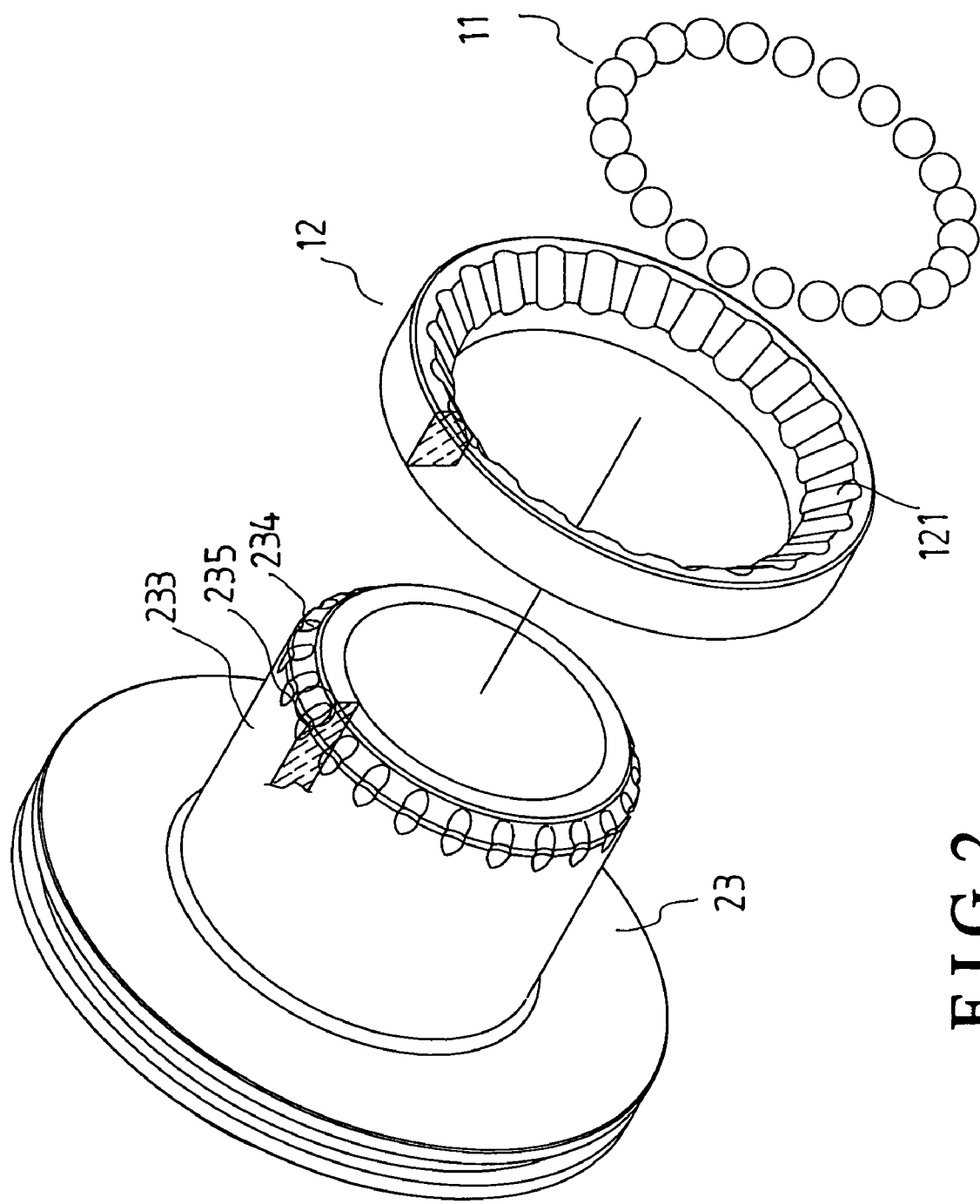
FIG. 2 is an exploded perspective view of the present invention.
Figure 3:
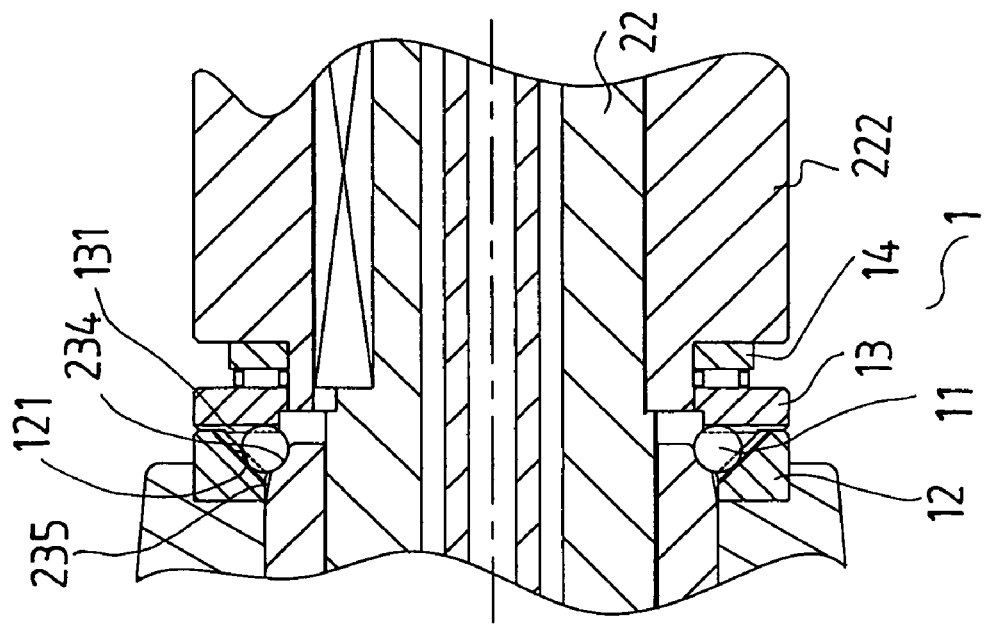
FIG. 3 is a partial cross-sectional view of the present invention (1)

Referring to FIGS. 1 to 3, a preferred embodiment of a turret of a lathe includes a shaft housing 21, a central shaft 22 in the shaft housing 21, a clutch 24, a first power source 25, a second power source (not shown), and a power transmission mechanism for use with the second power source. The central shaft 22 has a step-shaped portion 221, and a gear 222 secured thereon. Passages 231, and 232 are formed on the shaft housing 21. A pinion 251 is secured on a shaft of the first power source 25, and engaged with the gear 222. In the present embodiment, the second power source is an air pressure one.

The power transmission mechanism includes a piston 23, and a force multiplier unit 1, which includes several steel beads 11, a support ring 12, a push ring 13, and a sleeve member 233. The support ring 121 is securely disposed around the central shaft 22 in the shaft housing 21, and is formed with several spaced sloping trenches 121 on an inward side thereof. The push ring 13 is disposed next to the gear 222 of the central shaft 22, i.e. between the gear 222 and the support ring 12, and has spaced internal trenches 131 facing the sloping trenches 121 of the support ring 12. The piston 23 is positioned in a room of the shaft housing 21, and between the step-shaped portion 221 of the central shaft 22 and the gear 222, which room communicates with the passages 231, 232. The sleeve member 233 is securely joined to the piston 223 at one end, positioned around the central shaft 22, and passed through the support ring 12. In addition, the sleeve member 233 is formed with spaced concavely curved recesses 234, and sloping trenches 235 connected with respective ones of the concavely curved recesses 234 on the other end. And, a thrust bearing 14 is disposed between the push ring 13 and the gear 222. The angle between the sloping trenches 235 and the axis of the sleeve member 233 is smaller than that between the sloping trenches 121 and the axis of the support ring 12. In other words, the sloping trenches 121 are steeper than the sloping trenches 235. For instance, the angle between the sloping trenches 235 and the axis of the sleeve member 233, and the angle between the sloping trenches 121 and the axis of the support ring 12 are 10 degrees, and 45 degrees respectively. The steel beads 11 are held in respective ones of spaces defined by the sloping trenches 121, 235, the concavely curved recesses 234, and the internal trenches 131 of the push ring 13.

The clutch 24 is fitted to the shaft housing 21. Furthermore, a tool disk 3 is securely joined to one end of the central shaft 22 next to the clutch 24.

Figure 4:
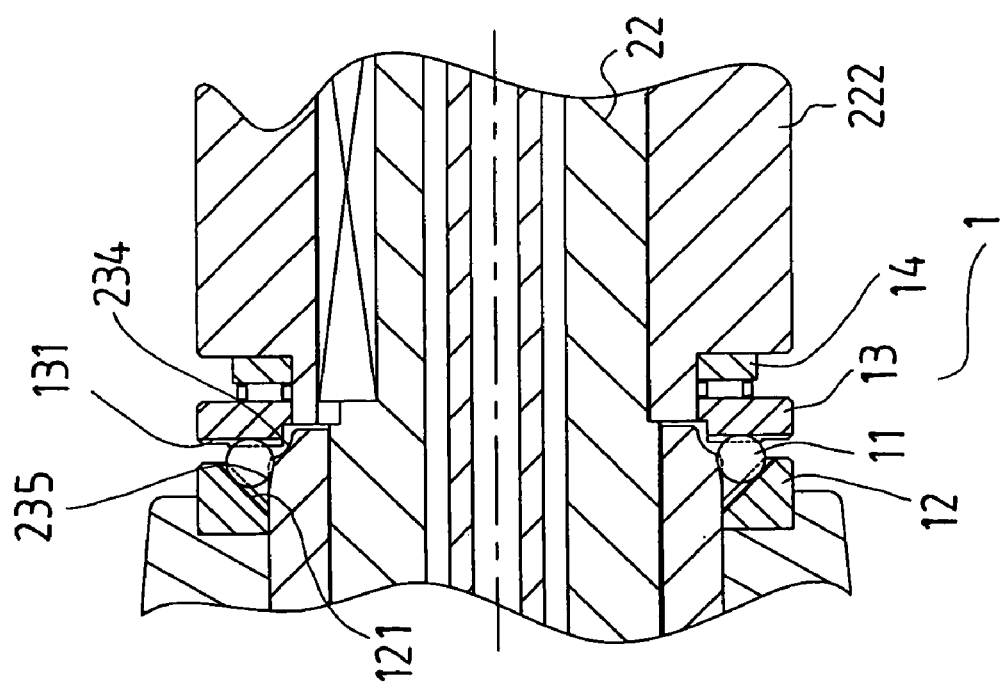
FIG. 4 is a partial cross-sectional view of the present invention (2)
Figure 5:
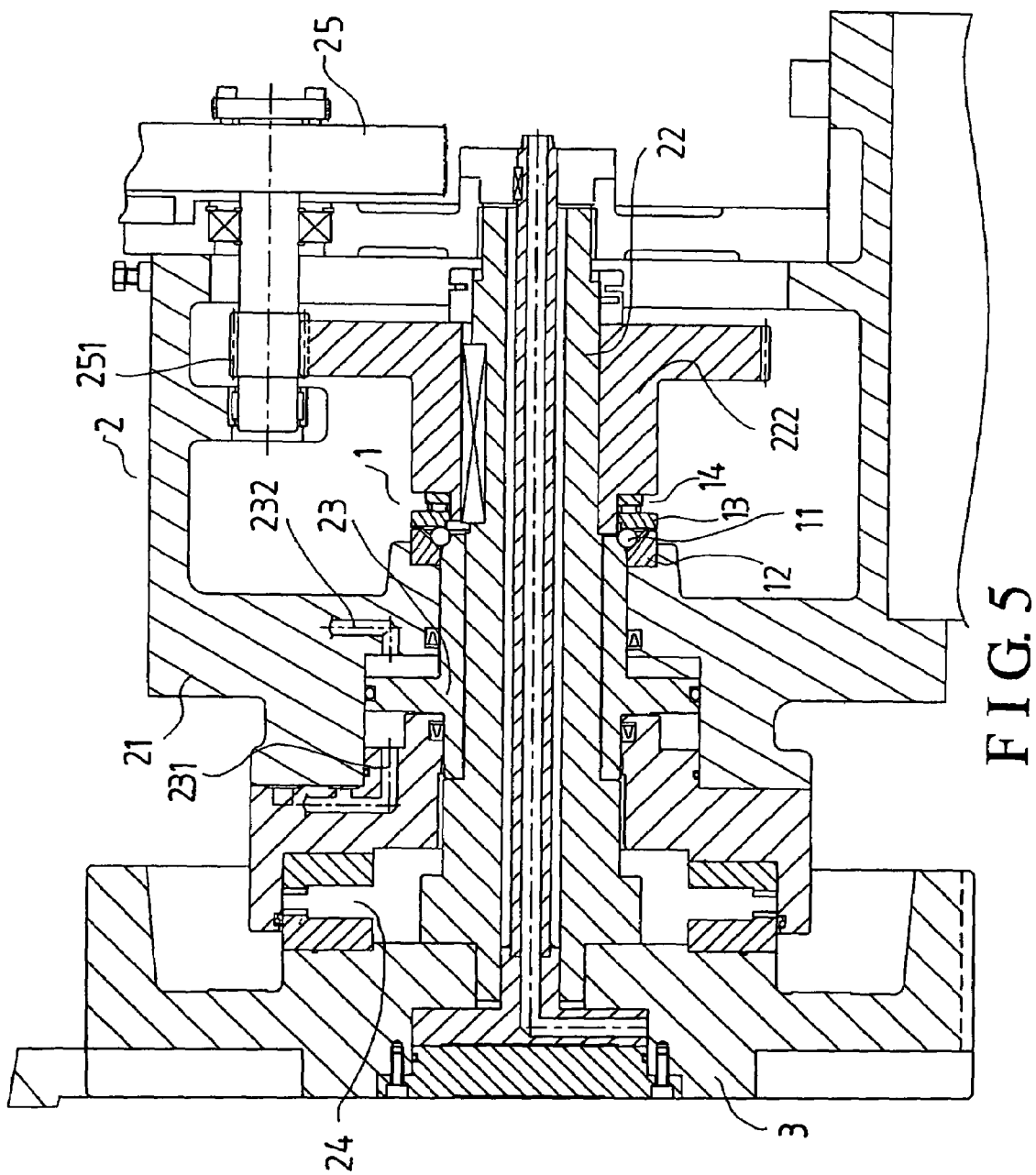
FIG. 5 is a cross-sectional view of the present invention in operation.
Figure 6:
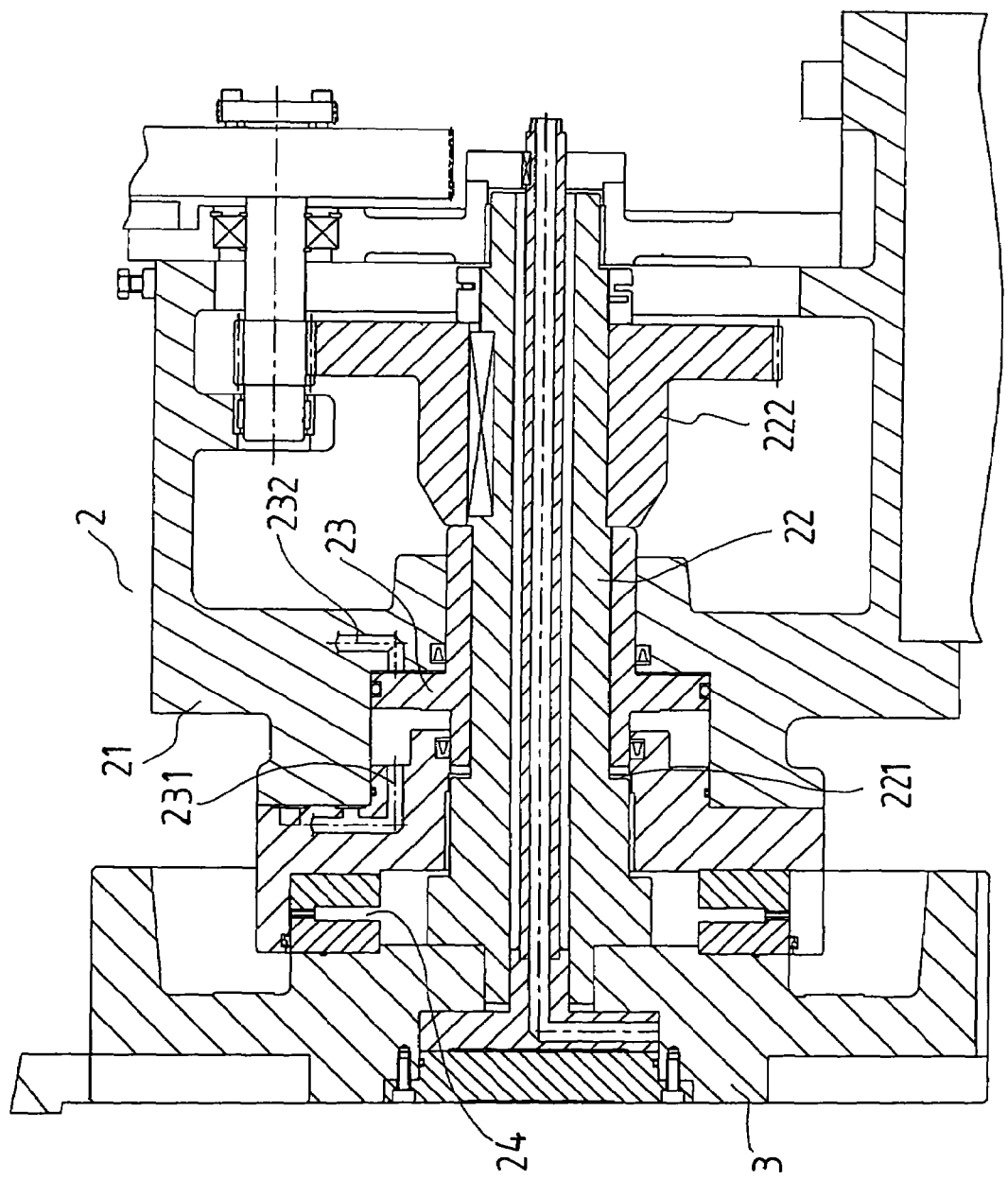
FIG. 6 is a cross-sectional view of the prior art in the Background.

When the piston 23 is moved rightwards by means of high pressure air supplied through the passage 231 by the air pressure power source, the sleeve member 233 will also move rightwards, and the steel beads 11 will relocate from the concavely curved recesses 234 to the sloping trenches 235, as shown in FIGS. 4 and 5. Next, the steel beads 11 will be pushed rightwards while being pressed against the push ring 13 as well as rolled along the sloping trenches 121, thus making the gear 222, the central shaft 22, and the tool disk 3 move rightwards. Consequently, the tool disk 3 is engaged with the clutch 24, and in turns, a workpiece can be machined with a certain one of the tools on the tool disk 3; because the angle between the sloping trenches 235 and the axis of the sleeve member 233, and the angle between the sloping trenches 121 and the axis of the support ring 12 are 10 degrees, and 45 degrees respectively, pushing force of the steel beads 11 on the push ring 13 will be several times the pushing force of the piston 23, and the tool disk 3 will be certainly engaged with the clutch 24, and secured in position.

When the piston 23 is moved leftwards by means of high pressure air supplied through the passage 232, the central shaft 22 will be pushed leftwards at the step-shaped portion 221 by the piston 23, and in turns, the tool disk 3 will disengage the clutch 24, and can be turned together with the central shaft 22 for switching one tool to another by the pinion 251, which is engaged with the gear 222, and connected to the shaft of the first power source 25.

From the above description, it can be easily understood that the present power transmission mechanism for a turret of a lathe has advantages as followings:

1. Because there is a small angle between the sloping trenches 235 and the axis of the sleeve member 233, and there is a large angle between the sloping trenches 121 and the axis of the support ring 12, the air pressure power source can provide multiplied pushing force to the tool disk 3, with which the tool disk 3 will be certainly engaged, and secured with the clutch 3, owing to the force multiplier unit 1. In other words, owing to the force multiplier unit 1, the air pressure power source can provide substantially as much power as hydraulic systems without increase to dimensions of the piston. Consequently, there won't be any disadvantage of conventional hydraulic systems, e.g. oil stain, oil leakage, high maintenance cost, in the present turret.
2. Power is passed on faster in an air pressure power source than in a hydraulic one therefore the turret will operate with increased efficiency, and tool switching will be faster.
3. Owing to the force multiplier unit 1, the air pressure power source can provide substantially as much power as a hydraulic system without increase to dimensions of the piston. And, there will be two options for the user in respect of power source, which options are an air pressure one, and a hydraulic one, and in turns, the present turret is more flexible.

What is claimed is:

1. A power transmission mechanism for a turret of a lathe, the turret including:
   (1) a shaft housing having first and second passages formed thereon;
   (2) a central shaft in the shaft housing; the central shaft having a first gear secured thereon;
   (3) a clutch fitted to the shaft housing;
   (4) a tool disk positioned next to the clutch and securely joined to one end of the central shaft; the tool disk being capable of moving together with the central shaft between a left position and a right position; the tool disk being engaged, and secured with the clutch when it is in the right position; the tool disk being disengaged from the clutch when it is in the left position; and
   (5) an air pressure power source connected to the first and the second passages of the shaft housing;
   the power transmission mechanism being used together with the air pressure power source for causing leftward and rightward movement of both the central shaft and the tool disk; the power transmission mechanism including:
   (1) a piston positioned next to the central shaft and in a first room of the shaft housing, which room communicates with the first and the second passages; the piston being capable of making the central shaft move in a same direction as the piston; and
   (2) a force multiplier unit including:
   (a) a support ring securely disposed around the central shaft in the shaft housing; the support ring being formed with a plurality of spaced sloping trenches on an inward side thereof;
   (b) a sleeve member securely joined to the piston at a first end, and positioned around the central shaft; the sleeve member being passed through the support ring at a second end; the sleeve member being formed with a plurality of spaced concavely curved recesses on the second end thereof; the sleeve member being formed with sloping trenches connected with respective ones of the concavely curved recesses; an angle between the sloping trenches of the sleeve member and an axis of the sleeve member being smaller than an angle between the sloping trenches of the support ring and an axis of the support ring; and
   (c) a plurality of steel beads held in respective ones of spaces defined by the sloping trenches, and the concavely curved recesses;
   when the piston and the sleeve member together are moved rightwards by means of high pressure air supplied by the air pressure power source, the steel beads being capable of relocating from the concavely curved recesses to the sloping trenches of the second end of the sleeve member, and next moving rightwards while being rolled along the sloping trenches of the support ring, thus pushing the central shaft rightwards with multiplied pushing force, and making the tool disk move to the right position, in which it is engaged and secured with the clutch.

2. The power transmission mechanism as claimed in claim 1, wherein a thrust bearing is disposed between the force multiplier unit and the gear of the central shaft.

3. A power transmission mechanism for a turret of a lathe, the turret including:
   (1) a shaft housing having first and second passages formed thereon;
   (2) a central shaft in the shaft housing; the central shaft having a first gear secured thereon;
   (3) a clutch fitted to the shaft housing;
   (4) a tool disk positioned next to the clutch and securely joined to one end of the central shaft; the tool disk being linearly displaceable together with the central shaft between a left position and a right position; the tool disk being engaged, and secured with the clutch when it is in the right position; the tool disk being disengaged from the clutch when it is in the left position; and (5) an air pressure power source connected to the first and the second passages of the shaft housing;

the power transmission mechanism being used together with the air pressure power source for causing leftward and rightward movement of both the central shaft and the tool disk; the power transmission mechanism including:

(1) a piston positioned next to the central shaft and in a first room of the shaft housing, which room communicates with the first and the second passages; the piston being capable of making the central shaft move in a same direction as the piston; and (2) a force multiplier unit including:

(a) a support ring securely disposed around the central shaft in the shaft housing; the support ring being formed with a plurality of spaced sloping trenches on an inward side thereof;

(b) a sleeve member securely joined to the piston at a first end, and positioned around the central shaft; the sleeve member being passed through the support ring at a second end; the sleeve member being formed with a plurality of spaced concavely curved recesses on the second end thereof; the sleeve member being formed with sloping trenches connected with respective ones of the concavely curved recesses; an angle between the sloping trenches of the sleeve member and an axis of the sleeve member being smaller than an angle between the sloping trenches of the support ring and an axis of the support ring;

(c) a movable push ring positioned next to the gear of the central shaft; the push ring having spaced internal trenches facing the sloping trenches of the support ring; and (d) a plurality of steel beads held in respective ones of spaces defined by the sloping trenches, the internal trenches of the push ring, and the concavely curved recesses;

when the piston and the sleeve member together are moved rightwards by means of high pressure air supplied by the air pressure power source, the steel beads being capable of relocating from the concavely curved recesses to the sloping trenches of the second end of the sleeve member, and next moving rightwards while being pressed against the push ring as well as rolled along the sloping trenches of the support ring, thus pushing the central shaft rightwards with multiplied pushing force, and making the tool disk move to the right position, in which the disk is engaged and secured with the clutch.

4. The power transmission mechanism as claimed in claim 3, wherein a thrust bearing is disposed between the force multiplier unit and the gear of the central shaft.

* * * * *